J. B. VANNOY.
WASHER.
APPLICATION FILED JULY 16, 1909.
948,600.
Patented Feb. 8, 1910.
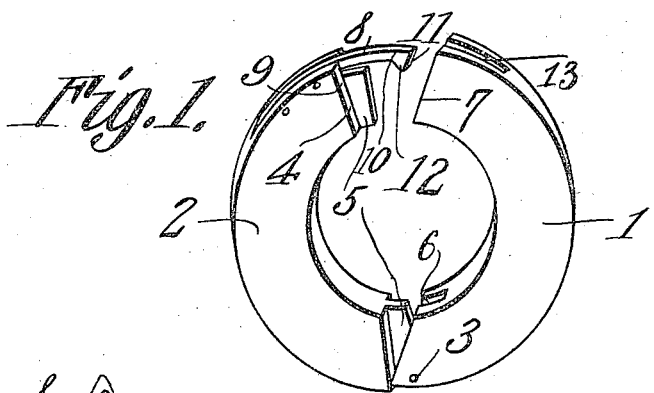
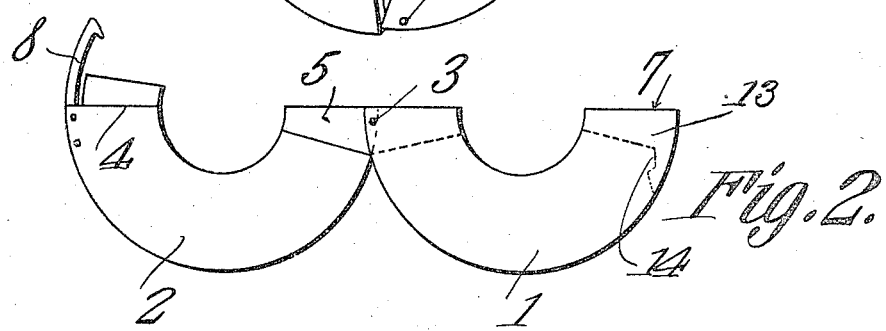
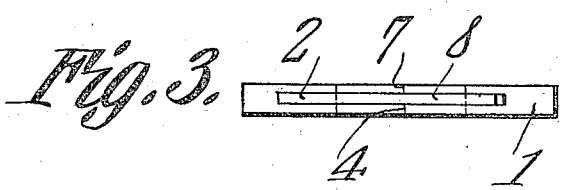
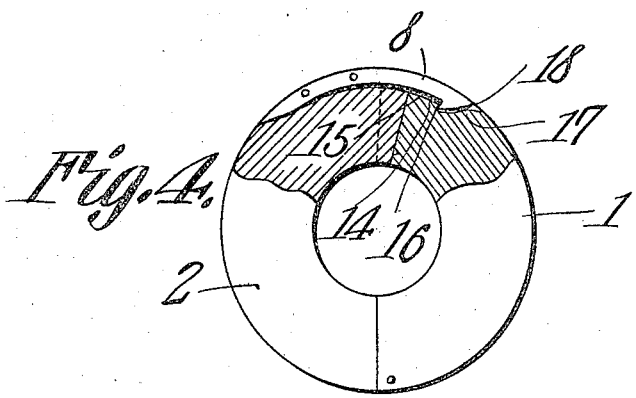
Witnesses
Francis Boyle
Inventor
John B. Vannoy.
By Cashow & Co.
Attorneys

UNITED STATES PATENT OFFICE.

JOHN B. VANNOY, OF McLEAN, TEXAS.

WASHER.

948,600.  Specification of Letters Patent.  Patented Feb. 8, 1910.

Application filed July 16, 1909. Serial No. 507,992.

*To all whom it may concern:*

Be it known that I, JOHN B. VANNOY, a citizen of the United States, residing at McLean, in the county of Gray and State of Texas, have invented a new and useful Washer, of which the following is a specification.

My invention relates to washers, and has for an object to provide a device of this character comprising a pair of hinged sections which open apart to a straight angle, whereby to facilitate readily applying the washer to position on the shank of a bolt.

Another object is to provide a device of this character which may readily and easily be applied to the shank of any bolt without removing the nut therefrom, thereby obviating the necessity of tearing apart machinery to replace worn-out washers with new ones.

A further object is to provide a device of this character in which the sections will be locked together without the use of pins, screws or any other similar locking devices.

One of the disadvantages experienced in the use of the usual hinge washer is that the abutting faces of the washer sections are not sufficiently reinforced to enable the parts to withstand any abnormal strain, the result being that the parts mash together and so injure the locking mechanism that it is practically inoperative when it is desired to remove the washer for any purpose; another disadvantage is that the sections will not be locked simultaneously with the opposed faces of the sections coming into contact, but some external means must be employed in fastening the sections together, the result being a great loss of time and labor in adjusting the washer to operative position.

To obviate these difficulties, my present invention comprises a pair of hinged sections, the opposed flat faces of which interfit in a tongue and groove joint which adequately reinforces the parts to withstand any amount of strain without mashing together and injuring the lock. The free ends of the sections are connected together by a spring lock which locks the moment the sections are pressed together and which is so constructed as to be easily and quickly released from its locked position when the removal of the washer is desired.

With the above advantages and other objects in view, which will appear as the nature of the invention is better understood, my invention comprises the novel details of construction and combination of parts illustrated in the accompanying drawing, shown in the following specification and set forth in the appended claims.

In the accompanying drawing,—Figure 1 is a perspective view of a hinged washer constructed in accordance with my invention showing the sections disengaged. Fig. 2 is a side elevation of the improved washer showing the sections open apart to a straight angle. Fig. 3 is a plan elevation of the washer showing the sections in engagement. Fig. 4 is a side elevation of the washer with parts broken away.

In a more detailed description of my invention in which similar characters of reference designate like parts in the views shown, the invention comprises a pair of substantially semi-circular flat faced sections 1 and 2 which are connected together at one end by a transverse pivot pin 3.

Formed on the contact faces 4 of one of the sections, are tongues 5 of a size to snugly engage grooves 6 formed in the opposed contact faces 7 of the companion section. The tongues 5 and the contact face 7 of the grooved section will, when the sections are open to their widest extent, be in alinement as shown in Fig. 2, the resulting advantage from this straight angle being to permit one-half of the section to be inserted beneath the contact face of a nut and engaged with the shank of a bolt when it may be rotated around the shank through the medium of the other section until the latter is in engagement with the shank of the bolt when the contact faces of the sections will have come into engagement and a spring lock will have operated to yieldingly hold the parts locked together.

The spring lock comprises a spring catch carried by one of the sections and a seat for engagement with the spring catch carried by the other section. The spring catch 8 is preferably formed from spring material and extends forward from the contact face of the free end of the tongued section in a plane with its tongue which is undercut, as shown at 9 to prevent any accidental contact with the spring catch. The head 10 or engaging portion of the spring catch is provided with a beveled face 11 terminating at its lower end in a shoulder 12 for engagement with a seat carried by the other section.

Formed in the circumferential edge of the groove section is a recess 13 shaped to conform to and constituting a seat for the spring catch 8.

Disposed on the bottom of the circumferential recess 13 is a keeper 14 having a beveled face 15 adapted for contact with the beveled face of the spring catch to guide the shoulder thereof into engagement with the shoulder 16 formed on the inner edge of the keeper. Thus it is evident that when the sections are pressed together, the spring catch will enter the seat and spring over the keeper as the sections reach their final position, whereby the parts are yieldingly held in engagement until released by the operator.

For releasing the parts from engagement, the inner wall 17 of the recess or seat 13 is inclined upwardly and rearwardly to form an opening 18 into which the point of a pin or similar tool may be inserted to pry the head of the spring catch from engagement with the keeper.

Although throughout the above description, the spring catch has been described as being formed on the section provided with the tongues, it is not intended to limit the arrangement of the spring catch to this position as in practice it may be disposed on the contact face of the slotted section, and the seat for engagement with the spring catch disposed on the contact face of the tongued section.

From the foregoing description taken in connection with the accompanying drawing, it is thought that the construction and operation of my invention may be easily understood without a more extended explanation, it being understood that various changes in the form, proportion and minor details of construction may be made without sacrificing any of the advantages or departing from the spirit of the invention.

What is claimed is:—

1. A washer comprising relatively movable sections hinged together at one end, one of said sections being provided with a circumferential recess and the other with a spring catch adapted to enter said recess, and means within the recess engageable with said catch whereby to hold the free ends of the sections together.

2. A washer comprising relatively movable sections hinged together at one end, one of said sections having a circumferential recess provided with a keeper on its bottom face and the other having a circumferentially disposed spring catch adapted to enter said recess and engage said keeper, whereby to yieldingly hold the free ends of the sections together.

3. A washer comprising a pair of flat faced semi-circular sections, one of which is provided with a circumferential recess having a keeper formed on its bottom face, the other having a spring catch provided with a terminal head engageable with said keeper for yieldingly holding the free ends of the sections locked together.

4. A washer comprising a pair of interfitting semi-circular sections, a pivot pin securing one end of the sections together, one of said sections having a circumferential recess provided with an upstanding keeper on its bottom face and the other section having a circumferentially disposed spring catch adapted to spring over and engage said upstanding keeper for yieldingly holding the free ends of said sections locked together, the circumferential edge of said spring catch being flush with the circumferential edge of the companion section when the parts are locked in position.

In testimony that I claim the foregoing as my own, I have hereto affixed my signature in the presence of two witnesses.

JOHN B. VANNOY.

Witnesses:
T. M. WOLFE,
W. C. MONTGOMERY.